INVENTOR.
WILLIAM C. WEHNER
BY
Burton & Parker
ATTORNEYS

June 25, 1968 W. C. WEHNER 3,389,928
BALL JOINT
Filed March 3, 1964 6 Sheets-Sheet 4

SHEET #4

INVENTOR.
WILLIAM C. WEHNER
BY
Burton & Parker
ATTORNEYS

3,389,928
Patented June 25, 1968

3,389,928
BALL JOINT
William C. Wehner, 14891 Grandville,
Detroit, Mich. 48223
Filed Mar. 3, 1964, Ser. No. 349,114
19 Claims. (Cl. 287—90)

ABSTRACT OF THE DISCLOSURE

This disclosure relates to a self-adjusting ball joint having a self-energizing jackscrew unit continuously urging the stud head of the ball joint into the primary bearing. The jackscrew unit includes a pair of threadedly connected members, which are urged to threadably expand by a resilient biasing means. The jackscrew unit may laterally float and thereby avoids jamming between the stud head and the opposed wall of the housing socket. A seal may be carried by one of the jackscrew members, which engages the inner wall of the housing, to provide a sealed chamber including the jackscrew unit.

---

This invention relates to improvements in self-adjusting ball joints having particular though not exclusive utility in automotive steerable wheel suspension systems, and is the outgrowth of further development of the invention disclosed in my co-pending application Ser. No. 159,053 filed Dec. 13, 1961, now U.S. Patent 3,250,555.

Though ball joints have been used for many years in automotive steering and suspension systems, there has long been a need for a joint which throughout the life of the vehicle would maintain the requisite tightness between ball and socket members. One form of joint utilizes an axially compresible spring or pad which urges the ball against its seat in the socket to take up wear of bearing surfaces with the force of the spring or pad being additive to the principal load on the joint. For a number of reasons this approach has led to difficulties not the least of which are that as wear is taken up the compressive force of the spring or pad diminishes eventually allowing looseness to develop with attendant vibration and chatter, and reverse or impact loading overcoming the principal load on the joint and the axial force of the spring or pad causes a pumping action tending to suck foreign matter into the joint and accelerating its deterioration.

Another form of joint has incorporated the provision for manual adjustment and requires periodic inspection and tightening as looseness develops to take up wear of bearing surfaces. This adjustment must be carried out carefully by properly skilled mechanics and even then the joint may not have the requisite tightness between ball and socket members.

Other forms of joints to solve the problem of wear take-up have also been suggested as shown by the following patents, among others: U.S. 1,926,487, 1,055,168, 463,627, and 1,883,782; British 459,068, and 518,640, and French 559,592. The joints disclosed in these patents never realized any appreciable commercial success in the automotive field because in every instance there were a number of deficiences in the design leading either to operational, manufacturing and/or assembly difficulties or high cost.

Summary of the invention

The ball joint of my invention includes a housing having a stud head receiving socket, a supporting seat which bearingly receives the stud head, and a wall opposite the stud head seat. A self-energizing jackscrew unit, including an internally threaded nut member threadably connected to an externally threaded screw member, is disposed between the aforesaid socket wall and the stud head to continuously urge the stud head against the seat upon expansion of the jackscrew unit. A spiral spring is connected to the nut and screw members to continuously urge the jackscrew member to threadably expand to maintain the stud head properly seated in the socket.

In the preferred embodiment of the self-adjusting ball joint of my invention, the axial length of the jackscrew unit, along its axis of rotation, is not greater than its major diameter, and the jackscrew unit is spaced from the encircling housing socket wall to permit lateral adjustment of the jackscrew unit. The jackscrew unit may laterally float between and in bearing engagement against the ball head and the aforesaid housing wall.

The preferred embodiment of my invention disclosed herein includes a sealing means carried by the outer jackscrew member which engages the encircling housing wall, and provides a chamber in the housing socket including the jackscrew unit. The sealing means may include a flexible annular lip which bears against the encircling socket wall. The housing wall referred to hereinabove may be provided by a cover plate enclosing one end of the housing socket. In this embodiment, the cover plate has an access opening which receives a locking means which temporarily restrains the jackscrew members against threaded movement during assembly of the joint.

An object of the present invention is to overcome the difficulties and disadvantages inherent in the prior art ball joints and to provide a ball joint particularly suitable for use in automotive steerable wheel suspension systems which is capable of automatic and continual self-adjustment so that service deterioration and human error factors are avoided, and which is of reasonable cost, and ease of manufacture and assembly.

Another object of the invention is the provision of a self-adjusting ball joint for automotive steerable wheel suspension systems which incorporates a jackscrew unit, and which will allow for greater wear take-up than conventional ball joints and yet is of the same external physical size and appearance as such joints, whereby the improved joint may be readily substituted in existing steerable wheel suspension systems and designs for such systems without necessitating changes in such systems or designs.

Another object of the invention is the provision of a self-adjusting jackscrew unit for automotive ball joints which is of such design, configuration and size that it may be readily substituted for the conventional compression spring and retainer plate of current ball joints without requiring any modification of the design or size of the housing (socket) and, in many instances, without change in the cover (closure plate). A concomitant object is the provision of a self-adjusting jackscrew unit as aforesaid which is designed for ease of manufacture, assembly and incorporation in ball joint housing, and is trouble free as well as substantially maintenance free.

Another and important object of the invention disclosed herein is the provision of a self-energizing jackscrew unit which is disposed between the ball head and the cover of the housing (socket) and which floats therebetween so that eccentricity of spherically curved ball and/or socket surfaces will not interfere either with smooth operation of the joint or impose undesirable stresses in the jackscrew unit. A concomitant object is the provision of a jackscrew unit which while being essentially non-yielding to reverse or impact loading of the joint will, on the other hand, yield through the aforesaid floating action sufficiently to compensate for manufacturing tolerance variations.

Another object of the invention is to provide a ball joint having a standard housing and load transmitting stud with an automatically operable wear take-up unit, and to provide simple means for sealing off the take-up unit from the stud so that grease is excluded from the interior working portions of the unit.

Another object of the invention is to provide an automatically operable wear take-up or jackscrew unit which is of shallow depth but relatively large diameter to fit within an axially short but relatively diametrically large space between the cover of the ball joint housing and a ball head in the housing and which unit has two relatively rotatable threaded members constantly driven or urged in a direction to elongate or distend axially the effective length of the unit by double acting stored energy means having connections with both said members in such fashion that a substantial mechanical advantage is obtained and either of said members is constantly capable of being rotatably actuated.

The spring loaded jackscrew unit herein disclosed is a self-energizing device in the sense that with the spring in wound up condition the unit will tend to unthread and expand and therefore precautions must be taken to temporarily lock the unit against expansion until it is properly positioned in the ball joint housing between the cover of the housing and the ball head with the cover locked in place. As ball joint housings of current design are substantially completely closed and/or sealed, access to the jackscrew unit to unlock it after the cover is in place cannot be readily carried out by prior art expedients. Therefore it is another object of the invention to provide a jackscrew unit which is designed to be locked against unwinding through the grease fitting hole in the cover, with the jackscrew unit and cover temporarily secured together until received and secured in the housing whereupon the jackscrew unit may be unlocked for normal functioning.

Other objects, advantages, and meritorious features will more fully appear from the specification, claims, and accompanying drawings wherein;

FIG. 9 is a view like FIG. 8, but showing a stage of its assembly;

In the following description it will appear that portions of the structure are similar in each illustrated joint and that many of the views are fragmentary in order to avoid repetitious disclosure. However, a complete ball joint is shown in FIG. 14 (sheet 5) and wherever possible corresponding parts thereof and similar reference numerals are carried through to other views for ease of explanation and understanding.

Figures 14, 15:
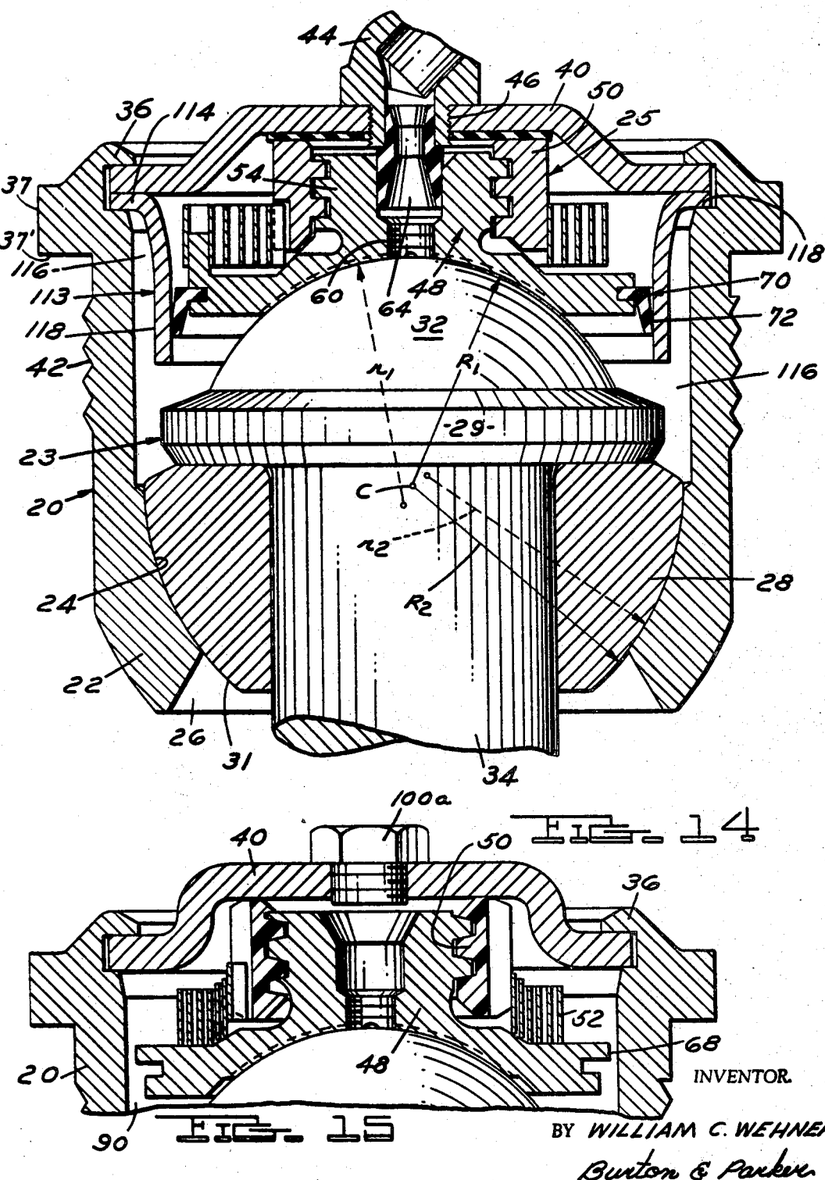
FIG. 14 is an enlarged sectional elevational view of a modified ball joint.
FIG. 15, is a view similar to FIG. 8 but without the seals and grease fitting.

In FIG. 14 a conventional automotive ball joint housing or socket member 20 is shown, with a conventional ball stud member ohaving a head 23 seated therein and a shank 34 extending outwardly therefrom through an opening 26, and with a conventional cover or closure plate 40 closing the housing. Because the housing, ball member and cover plate are conventional they will only be described to the extent necessary to bring out certain characteristics pertinent to the invention.

The interior of the socket is provided with a bearing surface 24 against which the head 23 of the ball is normally seated and urged by the automotive steerable wheel suspension system (not shown) with which the joint is to be operatively associated.

The head is additionally held toward and against the bearing surface 24 of the socket by the improved wear take-up means or jackscrew unit 25 which is disposed in laterally floating relation between the ball head 23 and an end wall of the socket, i.e., the housing cover 40, with one end bearing in rockable and force transmitting relation to the ball head and the other end bearing laterally slidably against the cover. The jackscrew unit operates to continuously exert a light but substantially non-yielding force against the ball head to prevent reverse or impact loading on the stud from unseating the head from the bearing surface 24. The bearing member 28 fits around the shank 34 of the ball stud with a slight clearance to allow for relative rotation between the bearing member 28 and stud.

More particularly the housing 20 has a necked in end portion 22 providing an internal semi-spherical bearing seat 24 adjacent the aperture 26. A semi-spherical bearing member 28 forming part of the ball stud head engages on the seat 24 for swivel movement, and such member supports the enlarged end portion 29 of the stud. The stud shank 34 projects outwardly of the aperture 26 for connection with a part (not shown) of the suspension system. The opposite end of the housing 20 is open for reception of the wear take-up assembly or jackscrew unit which is retained by a flange 37 which is, in this instance, spun over to retain the closure cap or cover 40. The housing 20 may be formed with external threads 42 for mounting the housing in a part of the suspension system which is movable relative to that part of the system engaged by shank 34, and when provided with such threads the flange 37 may be formed to provide a grip for a tool to enable threading of the housing 20, by its threads 42, into such part of the suspension system. Should the suspension system be designed for simply pressing the housing 20 into it rather than the aforementioned threaded connection, threads 42 are then omitted and surface 37' of flange 37 will serve to limit the press-in and locate the housing in the system. Lubrication of the working parts 28, 31 and 32 in the ball joint is obtained through a suitable fitting 44 (see FIG. 8) threaded in the cap 40 as at 46. While the present disclosure is greatly simplified by relying upon certain common parts, it should not be taken as limiting the invention to precisely the structure shown, as other housings and cover securing means may be equally useful.

Figures 1, 2, 4, 16:
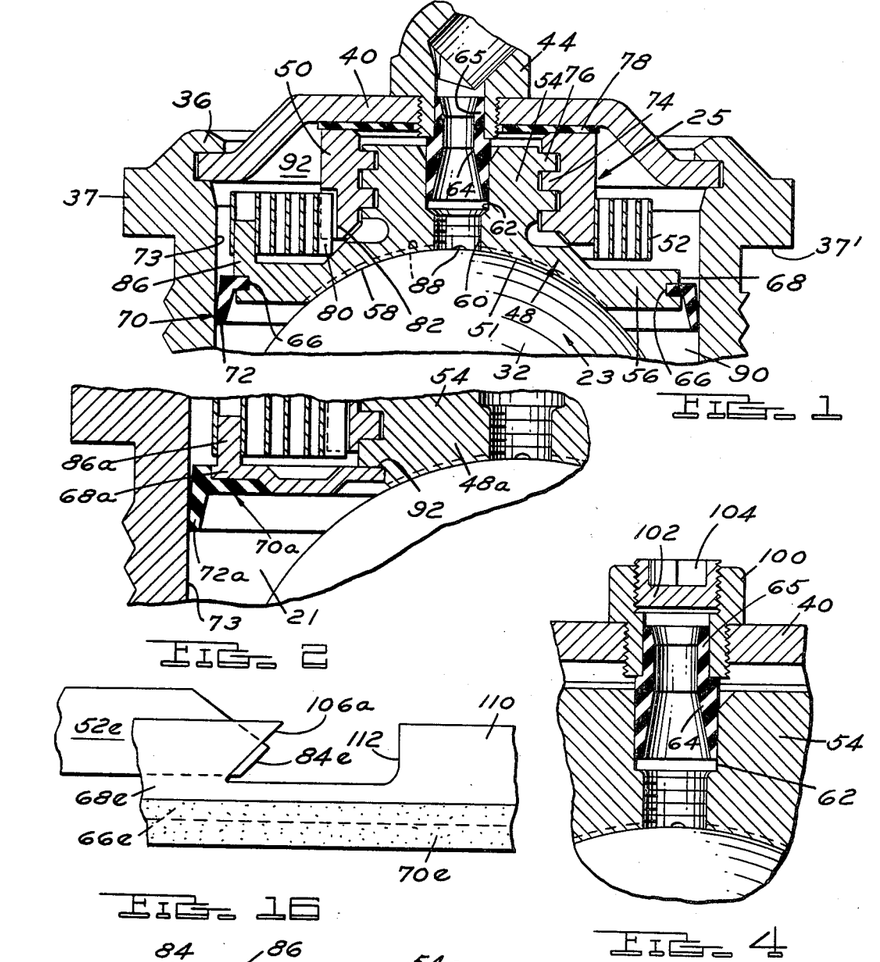
FIG. 1 is a fragmentary sectional view of so much of a ball joint as will serve to illustrate one embodiment of the present invention, a more complete ball joint assembly being illustrated in FIG. 14.
FIG. 2 is an enlarged fragmentary sectional view of a ball joint similar to that of FIG. 1, but incorporating certain modifications.
FIG. 4 is a view of a fragmentary part of FIG. 1, but illustrating a modification thereof.
FIG. 16 (sheet 1) is a fragmentary elevation of a modified connection between the outer end of the spiral spring and the periphery of the ball retaining member.

In FIG. 1, one form of the automatic wear take-up or jackscrew unit is shown for retaining the stud head 23 on its bearing seat 24 in the socket. Such unit comprises an externally threaded bearing screw or plug 48, an internally threaded screw member or nut 50, and stored energy means 52. The nut and bearing screw may be formed of steel or other material of suitable rigidity and tensile strength. The plug 48 is formed with a projecting screw portion or arbor 54 and a ball head engaging portion or flared skirt 56 providing a semi-spherical bearing face 58. The arbor 54 has a lubrication bore 60 which is counterbored at 62 to receive a flexible tubular seal 64. The seal 64 has its outer end extending above the abor 54. The periphery of skirt 56 of plug 48 is formed with an annular groove 66 and an oevrhanging marginal shoulder 68, both of which cooperate to support a lip seal 70 formed of an elastomeric material such as neoprene or rubber stretched around the periphery of the skirt and snapped in the groove. The lip seal 70 is retained by the lower margin of the groove, while the shoulder 68 affords a back-up making the flexible lip 72 more effective against the wall 73 of the socket housing 20 with which it has a sliding fit.

The nut 50 is an annular member which is threadedly engaged over the arbor 54 of the plug 48, preferably by square or acme type threads 74 on the nut and matching threads 76 on the arbor. I have found that 1/8 pitch single or double threads are quite satisfactory in providing requisite axial elongation of the jackscrew unit. The threads, in any event, should be of a self-locking pitch and yet of a sufficiently steep pitch so that all likely wear and assembly clearance may be taken up within approximately one turn or less between the nut 50 and plug 48. The upper end of the nut engages an elastomeric washer 78 to provide a certain degree of axial and tilting yield or float of the nut and plug relative to the fixed position of the cover 40. It will also be noted that the entire jackscrew unit can shift laterally relative to the housing and cover as emphasized by FIG. 7, by virtue of the flexible seals 64 and 70. This lateral shiftability and limited tiltability as well as limited axial yield afforded by the thin elastomeric washer 78 serves to allow compensation for production variations and tolerances in the sphericity of the stud head 23, and mating surfaces as hereinafter more fully explained.

Another important part of the assembly shown in FIG. 1 is the energy storing means 52 which is in the form of a flat spirally coiled spring having a plurality of turns wrapped about the nut 50 and with its inner end 80 engaged in a suitable notch or recess 82 formed in a marginal portion of the nut 50. The opposite outer end 84 of the spring 52 is suitably formed to engage upon an anchor pin 86 at the marginal edge of the bearing plug. The spring 52 is steadied in it wound up position by encircling the nut 50, and the turns of the spring are of such width in relation to the thickness as to be relatively stable against any tendency to distort out of the plane shown in FIG. 1. It can now be appreciated that the bearing plug 48, nut 50, and energy storing means 52 form a unitary assembly in which the threading action between the arbor 54 and the nut 50 can be from either end of the spring 52, so that if the bearing plug 48 should happen to stick or momentarily hang on the stud head 23 the nut 50 would be free to turn relative threeto to perform the desired automatic axial adjustment, or vice versa. The spring 52 continuously urges the plug 48 and nut 50 to elongate or distend the effective length of the wear take-up or jackscrew unit axially in the ball joint between the stud head 23 and the fixed cover 40, and since the elastomeric washer 78 may have a thickness of 0.020 inch, there will be relatively very little axial yield in the assembly, with the result that vibration and chatter of the stud head within the socket will be avoided.

Lubricant is supplied to the housing 20 of the ball joint assembly through fitting 44 which is threadedly mounted in the cover 40 in a position to surround the tubular projection 65 on the seal 64. In production, the lube fitting 44 and the projection 65 on the seal 64 may have a sufficiently tight fit so that the seal 64 can be assembled as a part of the fitting. Lubricant is directed through the central bore of the seal 64 and the bore 60 in the bearing plug where it can pass laterally through grease grooves 88 formed in the face 58 of the bearing plug to the chamber 90 in the housing 20 which is confined below the annular seal 70. The seals 70 and 64 effectively exclude lubricant from passing into the chamber 92 occupied by the spring 52. The exclusion of lubricant from chamber 92 in some ball joint applications is to be preferred. In other instances accumulation of lubricant on the convolutions of the spring may be of no concern and the seals 64 and 70 may be omitted as shown in FIG. 15, and the threaded aperture in the cover closed by a suitable plug 100a.

In FIG. 2 the ball joint assembly is shown in modified form with respect to the construction of the bearing plug 48a. The modification is directed to forming the arbor 48a. The modification is directed to forming the arbor portion 54 of the bearing plug 48a separately from the overhanging shoulder 68a, these two portions being suitably hydrogen brazed or soldered at 92 prior to assembly. The seal 70a is seated against the under peripheral surface of the shoulder 68a and is bonded thereto for purposes of holding it in its working position with the lip 72a working against the inner wall 73 of the housing bore.

Figure 3:
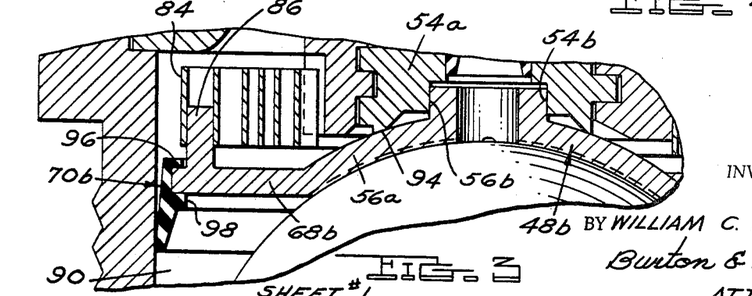
FIG. 3 is a further fragmentary sectional view of a modification useful in the ball joint of the type seen in FIG. 1.

In FIG. 3 a further modification is shown in which the arbor 54a for the bearing screw or plug is made of a separate bearing face portion 56a, the assembly being effected by brazing or soldering the central extension 56b into a suitable recess 54b in the arbor 54a, with an annular line contact 94 assuring proper coaxial alignment and load transmitting abutment. The rim 68b on the bearing portion 56a carries an annular seal 70b provided with a pair of peripheral snap flanges integrally formed on the seal which grippingly embrace the periphery of rim 68b to retain the seal in its functioning position.

In FIG. 4 there is shown means for preventing mechanics from inadvertently applying grease or lubricant to the ball joint having the seals 64 and 70. Such means may be used in connection with ball joints which fall into the class of "greased-for-life" ball joints. As shown, in place of the lubricant fitting 44 of FIG. 1, a bushing 100 is threaded into the cover 40 and engages around the seal extension 65 on the central tubular seal 64 on the arbor 54. The bushing carries a removable closure plug 102 having a tool receiving socket 104, with the plug threaded into place in the bushing. The closure plug 102 prevents greasing the ball joint until it has been removed and a suitable fitting threaded into its plug 100.

Figure 5:
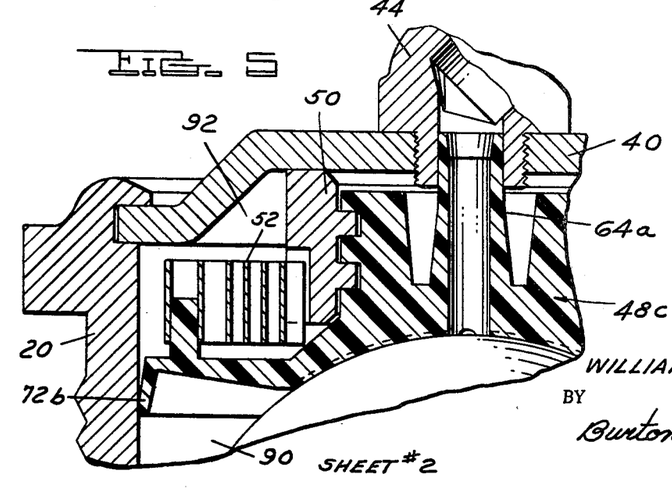
FIG. 5 is a view similar to FIG. 1, but showing a further modification in fragmentary sectional elevation.

Turning now to FIG. 5 it can be seen that other modifications are possible for the assembly illustrated in FIG. 1. For example, the bearing screw or plug 48c can be made of materials other than steel or the like, such as Delrin, Teflon or the like. In this event the arbor extension 54c thereon can be made with an integral tubular seal 64a which serves the same function as the separately formed seal 64. The bearing screw or plug 48c also may be formed with an integral sealing lip 72b, thereby avoiding the problem of mounting a separately formed seal.

When the bearing screw 48 is formed of Delrin, Teflon, or other stiffly resilient, yieldable or more readily distortable material than steel or similar rigid materials, there is sufficient flexibility in the bearing screw and consequently in the jackscrew unit, so that the elastomeric washer 78 may be omitted from between the nut and underside of the cover, and for this reason is not shown in FIG. 5.

In FIG. 9 the bearing screw 48d is formed of steel or the like, and the nut member 50d is formed of Delrin, Teflon or other suitable moldable material. In this instance as in the modification of FIG. 5, the elastomeric washer 78 may be omitted from between the nut and underside of the cover.

Figure 6:
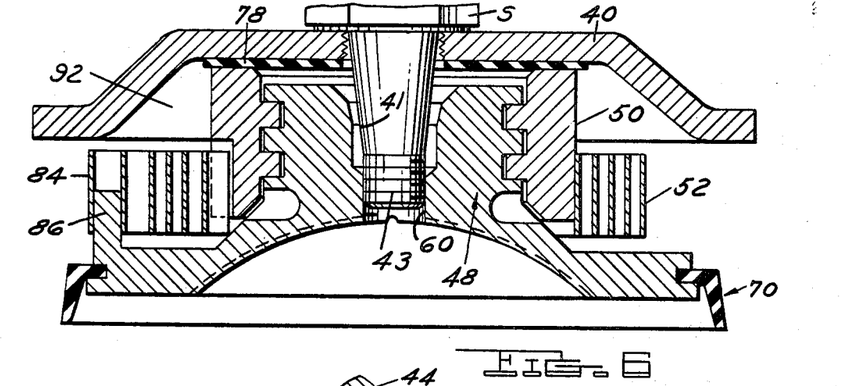
FIG. 6 is a greatly enlarged sectional elevational view of the automatically adjusting unit incorporated in the ball joint of FIG. 1.

FIG. 6 shows the elements comprising the self-energizing jackscrew unit of FIG. 1 held together with the cover for assembly in the housing 20. The nut 50 and the bearing screw 48 have been threaded completely together and the spring 52 engaged between the nut and bearing screw tensioning them in a direction to unscrew from one another and extend the effective length of the jackscrew unit. The nut and bearing screw are held against this unthreading by an assembly screw S having a tapering shank 41, for centering the unit and cover, terminating in the threaded end portion 43 which is threaded into the threaded bore 60 of the bearing screw. The head of the assembly screw holds the cover 40 downwardly tightly against the elastomeric washer 78. The threads of end portion 43 and bore 60 have a different helix angle than the angle of the acme threads 74 and 76 such that the tension of the spring 52 will not cause the bearing screw and nut to unwind, but the same will be locked in the position shown in FIG. 6.

The unit assembly as shown in FIG. 6 is received downwardly through the open end of the housing to be received in the socket thereof while the tool engaging flange 36 is in the phantom outline position indicated at 36' in FIG. 9. The tool engaging flange is spun over to the solid outline position shown at 36 to lock the cover 40 in place.

After the tool engaging rim 36 has been spun over and before the assembly screw S is removed there will be a slight clearance between the surface 32 of the ball stud head and the bearing surface 51 of the bearing screw, as illustrated, for example, in FIG. 9. This clearance will allow the cover to be secured tightly in place without preloading the head of the ball stud by an undetermined pressure. Upon removal of assembly screw S the bearing screw and nut will unwind under the influence of the spiral spring to urge the head of the ball stud against its bearing seat in the socket. Because the spiral spring may be manufactured with known spring rate and tension and the acme threads are formed with a known helix angle, the designer of the ball joint can predetermine with reasonable accuracy the force that the jackscrew unit will impose on the head of the ball stud. This force may be made relatively light so that it does not contribute substantially to the normally large force of the suspension system tending to wear the bearing surfaces of the ball stud head and socket. Though the force imposed on the ball stud head by the jackscrew unit is or may be relatively small, nevertheless it should be sufficient to give a snug feel upon relative movement of the stud shank and housing prior to assembly of the joint in the suspension system. Such preloading force imposed by the jackscrew unit is a substantially non-yielding force unlike conventional prior art compression spring retaining means in use today.

Figure 8:
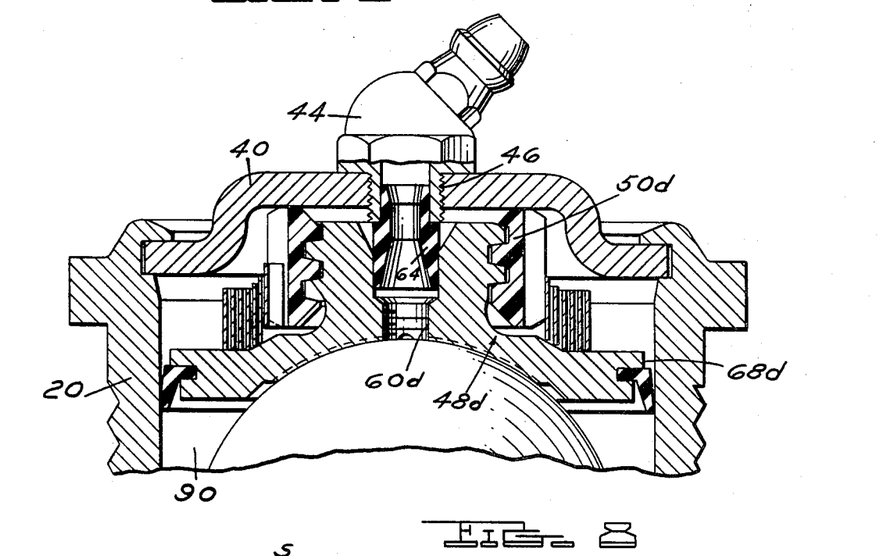
FIG. 8 is a fragmentary sectional elevational view of a modified ball joint assembly.
Figure 11:
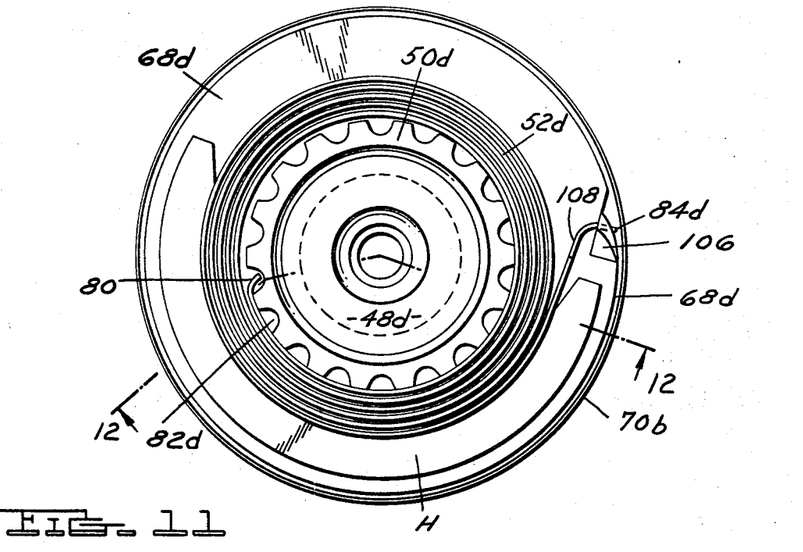
FIG. 11 is a top view of the automatic adjustment unit of FIG. 8 in a pre-assembly stage.
Figures 12, 13:
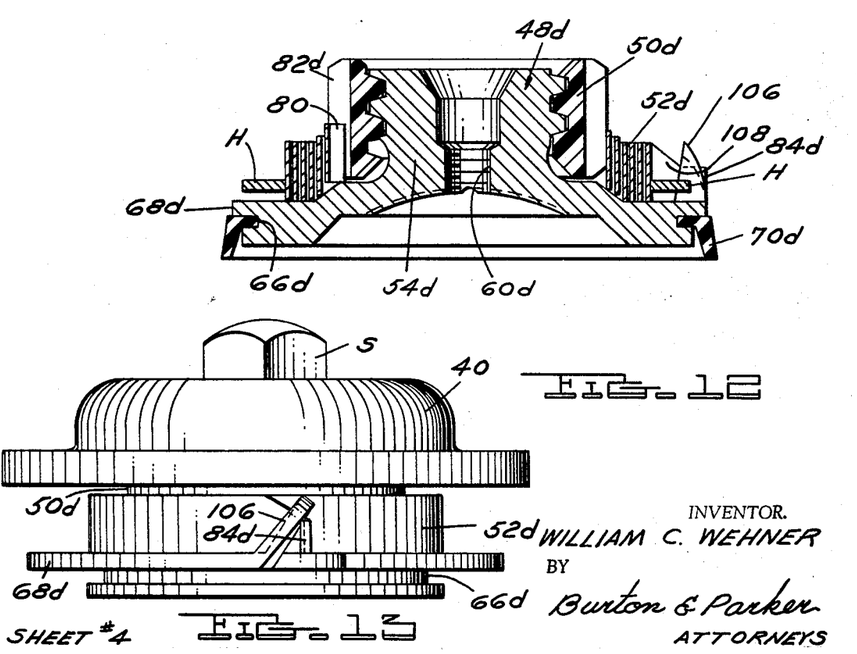
FIG. 12 is a sectional elevational view of the unit of FIG. 11 as seen at line 12—12 thereof.
FIG. 13 is an elevational view of certain components of the ball joint of FIG. 9 prior to assembly in the body of the ball joint.

Turning to FIGS. 8 and 9, the nut member 50d is provided with a notched periphery 82d as shown in FIG. 11, with the inner end of the spiral spring being inturned to be received within one of the notches. The outer end of the spring is turned outwardly to be trapped beneath the sloping tang 106 punched up out of the rim 68d of the bearing screw. The outer end of the spring may be tapered as at 108 to terminate in the outwardly turned end 84d. The slope of tang 106 will hold the outer end 84d of the spring from becoming accidentally disengaged from the bearing screw during vibration of the suspension assembly in which the ball joint is mounted as the tension of the spring will urge the end 84d downwardly along the incline of the tang, as best shown in FIG. 13.

Figure 10:
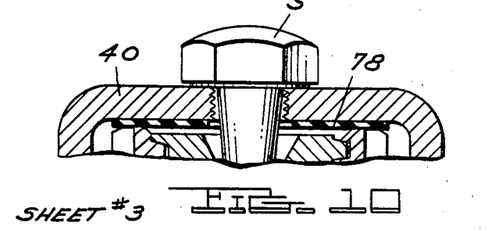
FIG. 10 is a fragmentary view of the means shown in FIG. 9, but incorporating certain modifications.

The spring 52d is assembled on the nut 50d and engaged at its inner end therewith and at its outer end with the tang 106 in the following fashion. The spring is first coiled upon itself and a horseshoe shaped retainer H then pressed over the spring to contain it against uncoiling. The nut 50d is threaded onto the bearing screw to the position shown in FIG. 12. The spring 52d is then slipped or pressed onto the nut in a position in which the outer end 84d will engage the tang 106 and the inner end 80 will engage one of the notches 82. The cover 40 is thereupon placed on the nut and the assembly screw S threaded into the threaded bore 60d of the bearing screw to lock the cover and jackscrew unit together. The parts are now in the relationship shown in FIG. 13. The horseshoe retainer is then removed to release the spring and allow it to react between the nut and screw 48 though the latter are held against unscrewing by the assembly screw S. Now the cover and jackscrew unit are ready for placement in the socket of the housing.

Where either the bearing screw or nut is made of Teflon, Delrin or the like to provide the requisite resilient compressibility or deformability, the utilization of the elastomeric washer may be omitted. Where both the nut and bearing screw are of relatively incompressible material, such as steel, the elastomeric washer 78 may be utilized as shown in FIG. 10. The nut 50d and the bearing screw 84d shown in FIG. 11 may both be formed of steel or either may be formed of plastic material of the character above mentioned.

Figure 17:
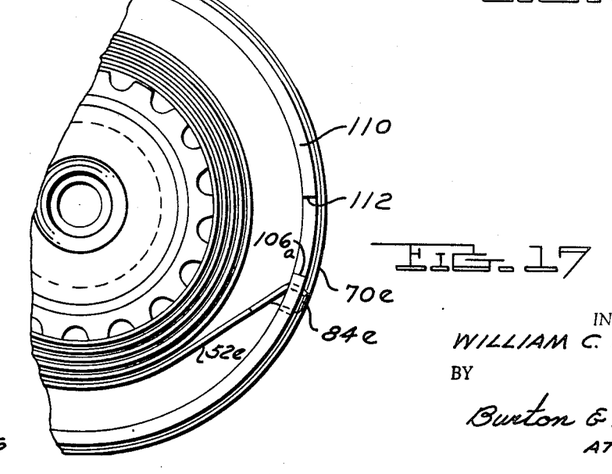
FIG. 17 is a fragmentary top view of a jackscrew unit incorporating the spring connection of FIG. 16.

A modification of the connection between the outer end of the spring and the bearing screw is shown in FIGS. 16 and 17. The peripheral edge of the rim 68d of the bearing screw may be provided with an upstanding annular wall extending around the periphery of the rim. A portion of such wall is indicated at 110. The wall is provided with a cut-out 112, one side of which is tapered as at 106a and the outer end 84e of the spiral spring is caught therebeneath. The outer end of the spring may be bent at an angle to conform to the angle of the edge portion 106a. The advantage of the wall 110 and the cut-out therein for engaging the outer end of the spring is that the rim 68d has a continuous unbroken bottom surface overlying the lip seal 70e rather than a surface interrupted by the space resulting from the upward punching of tang 106 in the FIGS. 11, 12 and 13 construction. The annular lip seal 70e and the peripheral notch 66e in the rim are also shown in FIG. 16.

Figure 7:
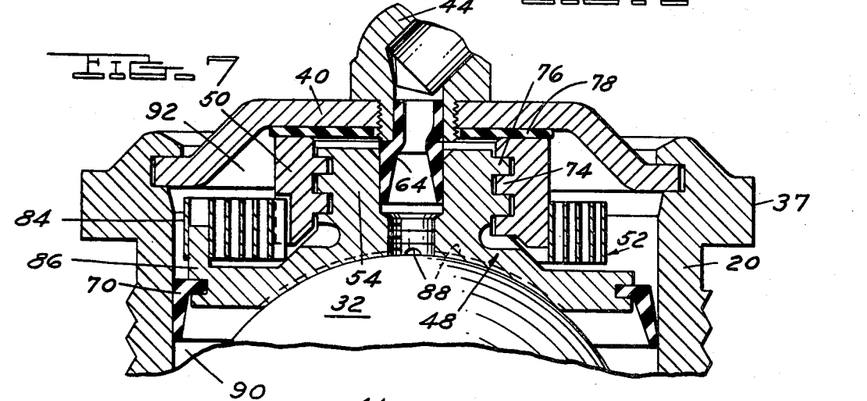
FIG. 7 is a view similar to FIG. 1 with the adjusting unit shown laterally shifted to show a feature of operation.

FIG. 7 illustrates in part the floating action that may occur between the jackscrew unit and the housing. The desirability of providing this floating action is brought out in connection with FIG. 14. Theoretically $R_1$ (the radius upon which surface 32 of the ball head is formed) and $R_2$ (the radius upon which surface 31 is formed) extend from a common mathematically exact center C. In practice, however, because of manufacturing tolerances or variations, the radius $r_1$ of surface 32 (the actual radius of such surface) and the radius $r_2$ of surface 31 (the actual radius of surface 31) do not extend from a common center but rather from different centers as shown in exaggeration in FIG. 14. As a result, surfaces 31 and 32 are eccentric with respect to each other, i.e., with respect to a mutual center line, and when the ball head tilts or rotates an eccentric or camming action occurs. This action may be thought of as causing variations from the mean distance between the underside of cover 40 and the ball head and unless compensated for may impose serious stresses in the jackscrew unit and cause undue wear of bearing surfaces. Therefore, when the ball stud 34 tilts relative to the housing 20, the jackscrew unit is allowed, by the construction herein disclosed, to shift laterally beneath cover 40 as shown in FIG. 7, and through the provision of the elastomeric washer 78 the unit may tilt slightly and/or be displaced axially toward cover 40.

Where the nut 50 or bearing screw 48 are formed of Delrin, Teflon or the like, washer 78 may be eliminated as the nut or bearing screw will itself yield sufficiently to allow slight tilting and/or axial displacement of the unit toward the cover. Deflection of the tubular seal 64 and lip seal 70 are illustrated in FIG. 7 during lateral displacement of the jackscrew unit.

Turning now to FIGS. 14 and 15, there is shown an assembly similar to that in FIG. 1 but wherein the same size jackscrew unit 25 is used in a housing 20 which is of a larger diameter than the housing of FIG. 1, and closure 40 is of a larger diameter so as to fit the larger housing. Since the bearing screw or plug 48 and seal 70 have the same diameter as in FIG. 1, there is obviously an annular gap created between the lip 72 on the seal and the adjacent socket wall. In order to permit a standard size jackscrew unit to be installed in a housing having a larger internal socket there is provided in the improvement of FIG. 14 an adaptor sleeve 113 which has a mounting flange or lip 114 engaged under the marginal edge or lip of the closure 40 when the securing flange 36 is spun over into position. The adaptor sleeve 113 is formed of a stiff material with a first tapered or conic section 116 extending from the mounting lip 114 and terminating in an inner cylindrical portion 118 which is positioned to cooperate with the seal 70. The tapered or conic portion 116 of the adaptor is provided in order to form a lead-in surface for the assembly of the seal 70, thereby assuring proper assembly. An advantage of the adaptor 113 is that it will permit the use of standard size parts 48, 50 and 52 in ball joint housings of larger diameter than would normally properly directly accommodate the seal 70 and thereby facilitate mass porduction of jackscrew units for various size ball joint assemblies. Variations in axial dimension between ball surface 32 and cover locating surface 118 can be accommodated by covers of either greater, lesser, or even reverse crown. A further advantage is that standard operating parts can be utilized in the lightweight vehicles whose ball joints are physically smaller than ball joints utilized in the heavier vehicles.

It will be apparent from the foregoing description that the jackscrew unit is floatingly disposed between the cover 40 and the ball head 23 and laterally slidably bears against the underside of the cover and the ball head surface to shift laterally and tilt as necessary to compensate for eccentricity of spherical surfaces of the ball head and/or socket, while at the same time not allowing any significant unseating movement of the ball stud head. The flexible lip seal 70 serves to allow this floating action of the jackscrew unit while maintaining an effective seal against the entry of grease from the ball head chamber 90 to the jackscrew spring chamber 92.

Figure 18:
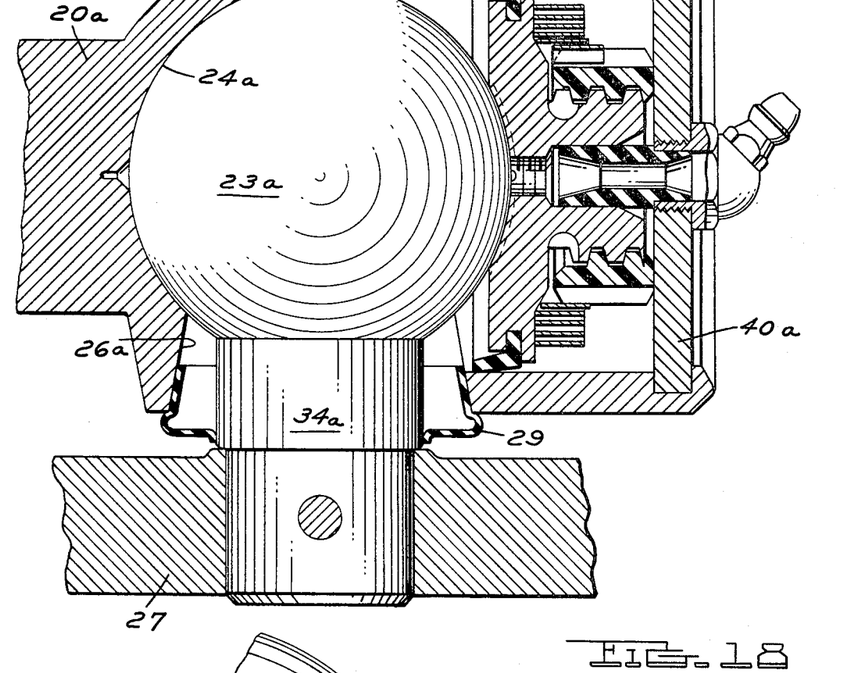
FIG. 18 is a sectional elevational view of a modified ball joint suitable for use in a pitman head or tierod end assembly.

In FIG. 18 the ball joint assembly is shown in an embodiment illustrative of the tierod end, pitman head or drag link end, in which the housing comprises an end 20a of a connecting rod or the like. The socket is provided with a spherically curved seat 24a against which nestles the ball head 23a of the ball stud, the shank 34a extending out of the socket through a side opening aperture 26a for connection in any suitable fashion to a part 27 to be driven by, or for driving, the rod 20a. A suitable flexible seal 29 may encircle the shank 34a and seal it in the opening 26a.

The jackscrew unit may be similar to that described in connection with FIG. 8 and a further description thereof is unnecessary. It should be noted that the cover 40a however, is flat rather than domed.

It will be understood by those skilled in the art that the use of the terms "ball joint," "ball stud," "ball head," etc. used hereinabove and in the claims, is intended as generic to swivel joints having a stud provided with an at least partially spherical head as herein disclosed, and is not intended as limited to spherical "balls," or a stud having a spherical "ball" head.

What is claimed is:

1. A self-adjusting ball joint comprising: a housing having a socket therein provided with a ball stud head supporting seat, a ball stud having a ball head nestled against said seat with a shank extending out of the socket, a wall of the socket spaced from the ball head and disposed on the opposite side thereof from said seat, a self-energizing jackscrew unit disposed between the ball head and said wall and spaced from an encircling wall of said socket for lateral floating alignment with the ball head for continuously urging the head against the seat and including an internally threaded nut member threadedly connected to an externally threaded screw member, one of said members having a spherically concave portion in bearing engagement with said ball head and the other of said members having a portion laterally shiftably bearing against said wall of the socket, and a spiral torsion spring wound externally about one of said members and connected at its inner end to a portion thereof and spaced radially outwardly therefrom being connected at its outer end to a portion of the other one of said members with the spring rotatably tensioning the nut and screw members in an unthreading direction to elongate the unit, said jackscrew unit having an axial length along its axis of rotation not greater than its major diameter to allow lateral floating of the jackscrew unit without jamming of the jackscrew unit between said ball head and said wall.

2. The invention as defined in claim 1 characterized in that a flexible annular grease seal engages the jackscrew unit and engages the encircling wall to seal the space between it and said encircling wall.

3. A self-adjusting ball joint comprising: a housing having a socket therein provided with a ball stud head supporting seat, a ball stud having a ball head in the socket rockably nestled against said seat with a shank extending out of the socket, a wall of said socket spaced from the ball head and disposed on the opposite side thereof from said seat, and a self-energizing jackscrew unit disposed spaced from an encircling wall of the socket in resistingly tiltable relation between and bearing against the ball head and wall and including a pair of threadedly connected members with spring means connected therebetween continuously rotatably urging them in an unthreading direction to extend the effective length of the unit and urge the ball head against its seat, and said jackscrew unit having a resilient portion disposed in axial load bearing relation between the ball head and said wall and yielding to normal eccentric movement of the ball head to accommodate for variations in the mean distance of the head from said wall.

4. The invention as defined in claim 3 characterized in that said resilient portion comprises an elastomeric pad disposed between said wall and said threadedly connected members.

5. The invention as defined in claim 3 characterized in that one of said threaded members is formed of resilient material and comprises said resilient portion of the jackscrew unit.

6. A self-energizing jackscrew assembly for mounting in a ball joint housing to urge the ball head against its seat comprising, in combination: a cover plate for securement in an open end of the housing to close such end and being imperforate except for an access hole, a jackscrew unit for disposition in floating relation between and bearing against the stud head and underside of the cover and including a pair of threadedly connected members with spring means connected therebetween continuously rotatably urging them to unthread and extend the effective length of the unit, locking means extending through said access hole of the cover with means thereon engaging one of said threaded members to draw the other of said threaded members against the underside of the cover to prevent unthreading of said members and provide a jackscrew assembly for reception in the open end of the housing.

7. In a ball joint assembly, a housing having a bore with a bearing in one end and having an opposite open end, a stud received in said housing and having a headed end on said bearing, and means to automatically and continually exert a force on the stud head to keep it on said bearing and to take up wear, said means including a first member engaged upon said stud head and having a threaded arbor extending therefrom toward the open end of the housing, a second member threadedly engaged upon said threaded arbor and having an end face remote from the stud head, closure means fixed in the open end of said housing, spirally wound spring means surrounding said second member, said spring means having one end portion engaged with said second member and the opposite end portion engaged with said first member for threadedly rotating said members relative to each other and driving said members in a direction such that said end face of said second member reacts against said closure means and said first member reacts against said stud head, and seal means carried by said first member in position to engage the bore of said housing inwardly of said closure means and provide a chamber in said housing, said second member and said means being located in said chamber.

8. The ball joint assembly set forth in claim 7 wherein seal means is carried by said first member in position to engage the housing bore inwardly of said closure means and provide a chamber in said housing adjacent said closure means, said seal means having freedom to move relative to said first member while maintaining engagement with the housing bore, and said second member and spring means being located within the chamber.

9. The ball joint assembly set forth in claim 7 wherein second seal means is carried by said first member adjacent said closure means, said second seal means having a lubricant passage therein extending from said closure means toward said stud head to direct lubricant in bypass of said chamber.

10. The ball joint assembly set forth in claim 9 wherein each of said seal means have flexible portions which yield upon movement of said first member relative to said housing in response to swivelling of said stud head.

11. An automatically operable wear take-up unit for a ball joint in which the ball joint includes a housing having a bore with an open end to receive said unit and an opposite apertured end provided with a bearing for a stud head swivelly movable relative to the bearing; said unit comprising a bearing plug formed with a bearing face complementary to the stud head and an arbor extension, a nut threadedly mounted on said arbor extension, a drive spring engaged between said plug and nut, said arbor extension having a passage formed therein, a closure member adapted to engage in the open end of said housing, said closure member having an opening aligned with said arbor passage, and a removable member insertable through said closure opening and having means for engagement in said arbor passage to temporarily urge said nut against the closure member to retain said plug, nut and drive spring in operable positions of assembly until disposed in said housing bore, removal of said members to which the outer end of the spring nut and drive spring for relative threading adjustment within said housing between said stud head and closure member.

12. The wear take-up unit set forth in claim 11 wherein said bearing plug carries an anchor tang, said nut is formed with a plurality of notches in its periphery, and said drive spring has one end portion engaged in one of said nut notches and an opposite end engaged with said anchor tang.

13. The wear take-up unit set forth in claim 11 wherein said bearing plug has a peripheral lip spaced from said bearing face, an achor tang is formed from a marginal portion of said lip, and said drive spring engagement with said plug is provided by said tang.

14. The wear take-up unit set forth in claim 13 wherein said tang is bent out of the plane of said peripheral lip, and said drive spring engagement with said tang is comprised of a beveled end fitted under said tang and held by the reaction between said bevel and tang.

15. The invention of claim 1 wherein said other one of said members to which the outer end of the spring is connected is provided with a radially extending peripheral flange having a sealing lip portion cooperating with a side wall encircling the jackscrew unit.

16. The invention of claim 1 wherein said encircling wall of said socket comprises a sleeve member extending annularly in spaced relation between the jackscrew unit and a side wall of the socket.

17. The invention of claim 3 wherein one of said members comprises a nut, and the other of said members comprises a screw formed of a resilient material.

18. A ball joint assembly including: a housing having a bore with an aperture in one end and an axially spaced opposite end; a stud having a shank extending through said aperture and an enlarged head swivelly bearing in said one end; a closure fixed adjacent the opposite open end of said housing; an extensible means in said housing between said stud head and said fixed closure, said extensible means comprising a first member having a bearing face engaged upon said stud head and an extensible portion directed axially toward said closure, a second member threadably engaged on said extensible portion and having a thrust face operably bearing against said closure, a resilient biasing means connected between said first and second members and operable to threadably adjust said first and second members relative to each other and in directions axially driving said second member toward said closure and said first member toward said stud head to maintain said stud head bearing in said one end, and a resilient seal carried by said first member and having a radially extending annular lip engaging said bore axially inwardly of said open end and providing a chamber within said housing between said seal and said closure, and said second member and said resilient biasing means confined in said chamber.

19. The invention as defined in claim 1, characterized in that the screw member is provided with said spherically concave portion in the form of an enlarged head portion having a spherically curved surface bearing against the ball head, and said threaded nut includes said portion which bears against said wall of the socket.

References Cited
UNITED STATES PATENTS

| | | |
|---|---|---|
| 1,619,291 | 3/1927 | Crawford. |
| 1,820,891 | 8/1931 | Spiller. |
| 1,903,078 | 3/1933 | Wollman. |
| 1,926,487 | 9/1933 | Krumm. |
| 1,962,057 | 6/1934 | Clutterbuck ________ 85—32.5 |
| 3,119,634 | 1/1964 | Gottschald _________ 287—87 |
| 3,021,157 | 2/1962 | Moskovitz. |

FOREIGN PATENTS

| | | |
|---|---|---|
| 145,457 | 2/1952 | Australia. |

EDWARD C. ALLEN, *Primary Examiner.*

CARL W. TOMLIN, *Examiner.*

A. KUNDRAT, *Assistant Examiner.*